(12) United States Patent
Lim et al.

(10) Patent No.: US 10,093,066 B2
(45) Date of Patent: Oct. 9, 2018

(54) MULTILAYERED COMPOSITE MATERIAL USING NANOFIBRILLATED CELLULOSE AND THERMOPLASTIC MATRIX POLYMER

(71) Applicant: KOREA INSTITUTE OF INDUSTRIAL TECHNOLOGY, Cheonan-si (KR)

(72) Inventors: Dae Young Lim, Yongin-si (KR); Ki Young Kim, Yongin-si (KR); Jin Ah Lee, Ansan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 0 days.

(21) Appl. No.: 15/106,147

(22) PCT Filed: Dec. 19, 2014

(86) PCT No.: PCT/KR2014/012556
§ 371 (c)(1),
(2) Date: Jun. 17, 2016

(87) PCT Pub. No.: WO2015/093884
PCT Pub. Date: Jun. 25, 2015

(65) Prior Publication Data
US 2017/0028672 A1     Feb. 2, 2017

(30) Foreign Application Priority Data

Dec. 19, 2013  (KR) .................. 10-2013-0159710
Dec. 18, 2014  (KR) .................. 10-2014-0183422

(51) Int. Cl.
*B29C 70/12*     (2006.01)
*B32B 5/02*      (2006.01)
(Continued)

(52) U.S. Cl.
CPC .............. *B29C 70/12* (2013.01); *B29C 51/00* (2013.01); *B32B 5/02* (2013.01); *B32B 5/022* (2013.01);
(Continued)

(58) Field of Classification Search
CPC ...... B29C 70/06; B29C 70/12; D04H 1/4374; B32B 5/26; B32B 23/10; B32B 2250/20; B32B 2260/023; B32B 2262/062
See application file for complete search history.

(56) References Cited

U.S. PATENT DOCUMENTS

| | | | | |
|---|---|---|---|---|
| 4,445,951 A | * | 5/1984 | Lind | .................. B29B 15/105 112/401 |
| 2005/0067730 A1 | * | 3/2005 | Yano | ....................... D21C 5/02 264/109 |

(Continued)

FOREIGN PATENT DOCUMENTS

| | | | | |
|---|---|---|---|---|
| GB | 1570000 A | * | 6/1980 | ........... B29B 15/105 |
| JP | 2008-229619 A | | 10/2008 | |

(Continued)

OTHER PUBLICATIONS

Larsson et al., "Polylactide Latex/Nanofibrillated Cellulose Bionanocomposites of High Nanofibrillated Cellulose Content and Nanopaper Network Structure Prepared by a Papermaking Route", Jan. 2012, pp. 2460-2466.*

(Continued)

*Primary Examiner* — John L Goff, II
(74) *Attorney, Agent, or Firm* — Seed IP Law Group LLP (57) ABSTRACT

The present invention relates to a multi-layered composite material manufactured by thermocompressing a multi-layered sheet, comprising: a first sheet layer formed from a solution containing nanofibrillated cellulose and a first thermoplastic matrix polymer; and a second sheet layer formed (Continued)

from a solution containing a second thermoplastic matrix polymer. The multi-layered composite material of the present invention has the high strength and high elastic modulus.

3 Claims, 6 Drawing Sheets

(51) Int. Cl.
| | |
|---|---|
| B32B 23/10 | (2006.01) |
| B32B 27/34 | (2006.01) |
| D04H 1/4374 | (2012.01) |
| D04H 1/425 | (2012.01) |
| D04H 1/4382 | (2012.01) |
| B29C 51/00 | (2006.01) |
| B32B 5/26 | (2006.01) |

(52) U.S. Cl.
CPC .............. *B32B 5/26* (2013.01); *B32B 23/10* (2013.01); *B32B 27/34* (2013.01); *D04H 1/425* (2013.01); *D04H 1/4374* (2013.01); *D04H 1/4382* (2013.01); *B32B 2250/20* (2013.01); *B32B 2260/021* (2013.01); *B32B 2260/023* (2013.01); *B32B 2260/046* (2013.01); *B32B 2262/04* (2013.01); *B32B 2262/062* (2013.01); *B32B 2307/54* (2013.01); *B32B 2307/546* (2013.01); *B32B 2307/558* (2013.01); *B32B 2309/02* (2013.01)

(56) References Cited

U.S. PATENT DOCUMENTS

| | | | |
|---|---|---|---|
| 2012/0178855 A1* | 7/2012 | Correa .................... | C08L 77/00 524/14 |
| 2013/0171439 A1* | 7/2013 | Shoseyov ............. | B82Y 30/00 428/220 |
| 2016/0376749 A1 | 12/2016 | Lim et al. | |

FOREIGN PATENT DOCUMENTS

| | | |
|---|---|---|
| JP | 2011-148214 A | 8/2011 |
| JP | 2011-184825 A | 9/2011 |
| JP | 2011-202101 A | 10/2011 |
| JP | 2011-235451 A | 11/2011 |
| JP | 2012-12713 A | 1/2012 |
| JP | 2012-214717 A | 11/2012 |
| JP | 2013-99940 A | 5/2013 |
| JP | 2013-185284 A | 9/2013 |
| KR | 10-2006-0116883 A | 11/2006 |
| KR | 10-0946630 B1 | 3/2010 |
| KR | 10-2011-0018155 A | 2/2011 |
| KR | 10-2011-0039901 A | 4/2011 |
| WO | WO 2013169204 A1 * | 11/2013 ............... C08L 23/02 |

OTHER PUBLICATIONS

Ahmed et al., "Bagasse hydrogels: water absorption and ions uptake," *Pigment & Resin Technology* 42(1):68-78, 2013. (13 pages).

Floury et al., "Effect of high-pressure homogenization on droplet size distributions and rheological properties of model oil-in-water emulsions," *Innovative Food Science & Emerging Technologies* 1(2):127-134, 2000.

Henriksson et al., "Cellulose Nanopaper Structures of High Toughness," *Biomacromolecules* 9(6):1579-1585, 2008.

Ho et al., "Liquid Ammonia Treatment of (cationic) Nanofibrillated Cellulose/ Vermiculite Composites," *Journal of Polymer Science Part B: Polymer Physics* 51(8):638-648, 2013.

Ksibi et al., "Synthesis and solid characterization of nitrogen and sulfur-doped $TiO_2$ photocatalysts active under near visible light," *Materials Letters* 62(26):4204-4206, 2008.

Lee et al., "A Study on Fabrication of Microfibrillated Cellulose by Homogenization: Process (I)—Aqueous Ammonia Treatment Effects," *12th Asian Textile Conference*, Shanghai, China, Oct. 23-26, 2013, pp. 178. (5 pages).

Lee et al., "Effect of Aqueous Ammonia Treatment on Microfibrillated Cellulose / Polyamide Fiber Composites," *2013 Fall Conference of the Korean Fiber Society*, Gangwon-do, South Korea, Oct. 17-18, 2013, 3 pages.

Lee et al., "Enhancement of enzymatic accessibility by fibrillation of woody biomass using batch-type kneader with twin-screw elements," *Bioresource Technology* 101(2):769-774, 2010.

Mwaikambo et al., "Chemical Modification of Hemp, Sisal, Jute, and Kapok Fibers by Alkalization," *Journal of Applied Polymer Science* 84(12):2222-2234, 2002.

Nakagaito et al., "Toughness enhancement of cellulose nanocomposites by alkali treatment of the reinforcing cellulose nanofibers," *Cellulose* 15(2):323-331, 2008.

Pääkkö et al., "Enzymatic Hydrolysis Combined with Mechanical Shearing and High-Pressure Homogenization for Nanoscale Cellulose Fibrils and Strong Gels," *Biomacromolecules* 8(6):1934-1941, 2007.

Seydibeyoğlu et al., "Novel nanocomposites based on polyurethane and micro fibrillated cellulose," *Composites Science and Technology* 68(3-4):908-914, 2008.

Siqueira et al., "Cellulosic Bionanocomposites: A Review of Preparation, Properties and Applications," *Polymers* 2(4):728-765, 2010.

Siró et al., "Microfibrillated cellulose and new nanocomposite materials: a review," *Cellulose* 17(3):459-494, 2010.

Sternitzke et al., "Alumina/Silicon Carbide Nanocomposites by Hybrid Polymer/Powder Processing: Microstructures and Mechanical Properties," *Journal of the American Ceramic Society* 81(1):41-48, 1998.

Vaia, "Polymer Nanocomposites Open a New Dimension for Plastics and Composites," *AMPTIAC Quarterly* 6(1):17-24, 2002. (12 pages.).

Zimmermann et al., "Cellulose Fibrils for Polymer Reinforcement," *Advanced Engineering Materials* 6(9):754-761, 2004.

\* cited by examiner

FIG. 10

MULTILAYERED COMPOSITE MATERIAL USING NANOFIBRILLATED CELLULOSE AND THERMOPLASTIC MATRIX POLYMER

TECHNICAL FIELD

The present invention relates to a multi-layered composite material comprising nanofibrillated cellulose and thermoplastic matrix polymer, and a method of manufacturing the same.

BACKGROUND ART

The technologies relating to nanomaterials are being applied to various industrial fields, and it is known that the application of these technologies to general polymers can improve their physical, chemical, and thermal characteristics.

In particular, it is reported that the nanocomposite material, which is a material reinforced with nano-sized raw materials, has excellent physical properties compared to general composite materials (R. A. Vaia, Polymer Nanocomposites Open a New Dimension for Plastics and Composites, *The AMPTIAC Newsletter*, 2002, 6, 17-24), and also that the nanocomposite material show an increased elastic modulus as well as increased strength (M. M. O. Seydibeyoglu et al., *Composites Science and Technology*, 2008, 68, 908-914). It is known that the increase in strength could be attributed to the increase in specific surface area of nanomaterials, and the decrease in the interfacial defects between the nanomaterial and the matrix polymer, compared to the composite material reinforced with micro-sized raw materials (M. Sternitzke et al., *Journal of the American Ceramic Society*, 1998, 81, 41-48).

Meanwhile, cellulose is the most abundant natural polymer among all organic compounds present in nature. It can be obtained from renewable materials, and has a biodegradable property by which it can be decomposed in soil and returned to nature, unlike the conventionally used petroleum-based polymers. Recently, with a growing demand for the environmentally friendly polymer materials due to serious environmental issues being raised, intensive studies have been performed to develop cellulose raw materials and products thereof to replace petroleum-based functional polymers (G. Siqueira et al., *Polymer*, 2010, 2, 728-765).

In particular, nanostructured fibrillated cellulose can be used for composite materials as a reinforcing material, because it has high elastic modulus of 150 GPa to 200 GPa and high strength of 5 GPa. The nanostructured fibrillated cellulose has excellent physical properties compared to Kevlar® fibers, a well-known super fiber. Moreover, the nanostructured fibrillated cellulose has a nano-scale diameter, which is smaller than that of the general carbon fibers and glass fibers (diameter of 10 nm to 100 nm). Further, it has a low thermal expansion coefficient (0.1 ppm $K^{-1}$), is economical, recyclable, lightweight, has low energy consumption, and has excellent processability. Accordingly, there is a high possibility that cellulose nanofiber can replace the glass fiber, which is a core material in the composite material industry, by adjusting its diameter (nano-sized) and aspect ratio (L/D), based on its excellent characteristics such as high crystallinity, tensile strength, and elastic modulus.

The nanomaterial manufactured from 100% cellulose nanofibers having the advantages described above has been reported to have excellent physical properties compared to the ordinary steel or magnesium alloys. However, since the above composite material consists only of 100% cellulose, long-term drying and compression are required due to the process characteristics, and it has been known that the composite material can be manufactured only in the form of a sheet. Additionally, the above composite material has no thermoplasticity, and thus there is a problem in that the material cannot be formed into various shapes (Marielle Henriksson et al., 2008; Istva'n Siro et al., 2010).

However, the thermoplastic and thermosetting composite material reinforced with the cellulose nanofiber has a high potential to be used as an environmentally friendly high-performance new material for next generation, capable of overcoming the limitations of the existing glass fiber-reinforced composite materials. With the development of modern industry, there has been a demand for products with low weight and high strength. Thus the cellulose nanofiber composite material having high performance and high function can expand its applications as a core material to the industrial fields, such as electronics, transporting devices (e.g., automobiles, aircraft, ships, etc.), civil engineering, construction, environment, etc., the defense industry, and prosthetic devices in the medical industry.

Additionally, in the $21^{st}$ century, much research and developments have continuously focused on a technical field of green nanocomposites, which is a new converging technology of nanotechnology and composite material technology, as a method for resolving environmental, energy, and resource problems. It is highly likely that the cellulose nanofiber composite will have a solid position as a new high-performance composite material surpassing the limitations of existing materials due to its environmental friendliness, cost effectiveness, and sustainability for the next generation. The green composites with such various and excellent physical properties can ultimately provide a base for fundamental technologies to obtain advanced multifunctional materials having mechanical functions of high strength and high elastic modulus, electric and thermal conductivities, low thermal expansion coefficient, etc., which cannot be obtained from the conventional materials.

However, the research and development of thermoplastic composites using the cellulose nanofiber is still in its early stages.

Accordingly, the present inventors have completed the present invention relating to a multi-layered composite material comprising the thermoplastic matrix polymer and the nanofibrillated cellulose having physical properties superior to glass fiber.

DISCLOSURE OF INVENTION

Technical Problem

An object of the present invention is to provide a multi-layered composite material capable of replacing glass fiber-reinforced composite materials, comprising nanofibrillated cellulose (NC) and thermoplastic matrix polymer.

Technical Solution

A first aspect of the present invention provides a multi-layered composite material manufactured by thermocompressing a multi-layered sheet including:
  a first sheet layer formed from a solution containing nanofibrillated cellulose and a first thermoplastic matrix polymer; and
  a second sheet layer formed from a solution containing a second thermoplastic matrix polymer, wherein the first thermoplastic matrix polymer and the second thermoplastic matrix polymer are hot-melt bonded, and the nanofibrillated cellulose is inserted between the hot-melt bonded polymers.

A second aspect of the present invention provides a method of manufacturing a multi-layered composite material, including:

a first step of preparing a multi-layered sheet by laminating at least one of a first sheet layer prepared by drying and compressing a solution containing nanofibrillated cellulose and a first thermoplastic matrix polymer; and at least one of a second sheet layer containing a second thermoplastic matrix polymer; and a second step of hot-melting the first thermoplastic matrix polymer and the second thermoplastic matrix polymer by applying a pressure at a temperature below the degradation temperature of nanofibrillated cellulose, wherein the first sheet layer and the second sheet layer are alternately laminated.

A third aspect of the present invention provides a reinforced molded product containing the multi-layered composite material of the first aspect.

Hereinafter, the present invention is explained in more detail.

As used herein, the term "a multi-layered composite material" refers to a material in which multiple layers of different components are laminated. Specifically, in the present invention, at least one first sheet layer and second sheet layer may be alternately laminated.

For the thermoplastic matrix polymer of the present invention, any thermoplastic polymer having excellent compatibility (e.g., interfacial affinity) with nanofibrillated cellulose may be used without limitation and the thermoplastic polymer may preferably be the polyamide (PA) resin. The polyamide resin is a synthetic polymer in which the structural units forming a backbone are linked by amide groups, and specifically includes polyamide 6, polyamide 66, etc. The first thermoplastic matrix polymer and the second thermoplastic matrix polymer of the present invention may be the same or different.

The length of PA fibers is preferably in the range of 0.1 mm to 3.0 mm. When the fiber length becomes longer than 3.0 mm, there is a difficulty in dispersion while mixing with water due to the long fiber length, whereas when the fiber length becomes shorter than 0.1 mm, the sheet manufactured therefrom lacks stability in shape. The fineness of fiber is preferably in the range of 0.1 denier to 5.0 denier.

The diameter of the nanofibrillated celluose of the present invention may be in the range of 10 nm to 100 nm.

The second sheet layer formed from the second thermoplastic matrix polymer of the present invention may be a hot-melt web, a meltblown nonwoven fabric, or a film, and preferably a meltblown nonwoven fabric, according to the morphological analysis.

In the step of manufacturing a multi-layered sheet by thermocompressing the second sheet layer on top of the first sheet layer in the present invention, the thermocompressing will be performed at 100° C. to 200° C. when the second sheet layer is a hot-melt web, whereas the thermocompressing will be performed at 170° C. to 270° C. when the second sheet layer is a meltblown nonwoven fabric.

Additionally, the thermocompressing may be performed at a pressure range of 4 MPa to 100 MPa.

The first thermoplastic matrix polymer of the first sheet layer and the second thermoplastic matrix polymer of the second sheet layer are hot-melt bonded by the thermocompressing, and the nanofibrillated cellulose is inserted between the hot-melt bonded polymers. As a result, the adhesive force between the two sheet layers becomes stronger, and then, the tensile strength of the multi-layered composite material is increased. When the temperature exceeds the above described range, the nanofibrillated cellulose becomes degraded and brittle, which leads to destruction of the fiber structure. Accordingly, the temperature for the thermocompressing is preferably in the range at which thermoplastic polymers can be selectively melted, while being lower than the degradation temperature at which nanofibrillated cellulose will not become brittle.

When the second sheet layer, which was formed from a solution containing the second thermoplastic matrix polymer, is laminated on top of the first sheet layer formed from a solution containing nanofibrillated cellulose and the first thermoplastic matrix polymer, and subjected to thermocompressing, the second thermoplastic matrix polymer becomes melted by thermocompressing and flows into the pores of the first sheet layer, thereby playing the role of connecting fibers of the two sheet layers with each other.

When comparing the dispersion state, the nanofibrillated cellulose with the thermoplastic matrix polymer has better dispersion compared to a sheet formed only of nanofibrillated cellulose. In the thermoplastic matrix polymer, the nanofibrillated cellulose forms a mesh network, and can interact with other nano-sized fibers via hydrogen bonding or entanglement. Thus, the reinforcing effect of the nanofibrillated cellulose is greater when the nanofibrillated cellulose is inserted into the sheet containing thermoplastic matrix polymer, compared to the sheet formed only of nanofibrillated cellulose.

Figure 1A:
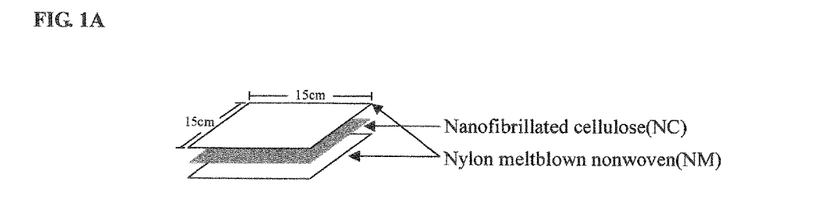
FIGS. 1A and 1B show the multi-layered composite materials formed by laminating or thermocompressing the sheet consisting of nanofibrillated cellulose and meltblown nonwoven fabric, which is an adhesive layer, by a conventional method.
Figure 1B:
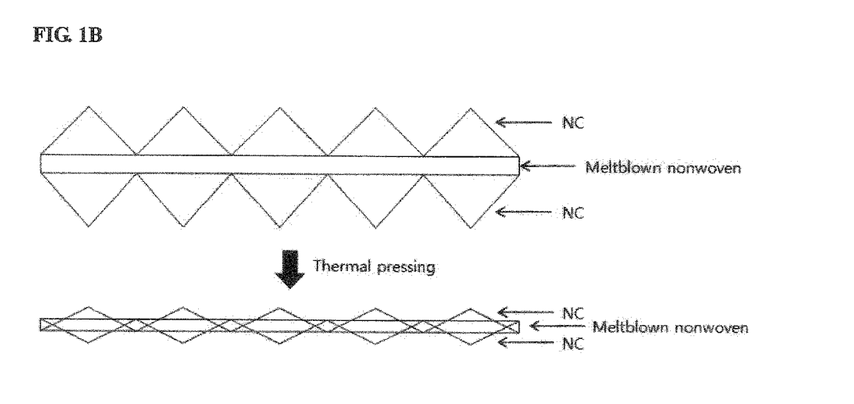
Figure 1C:
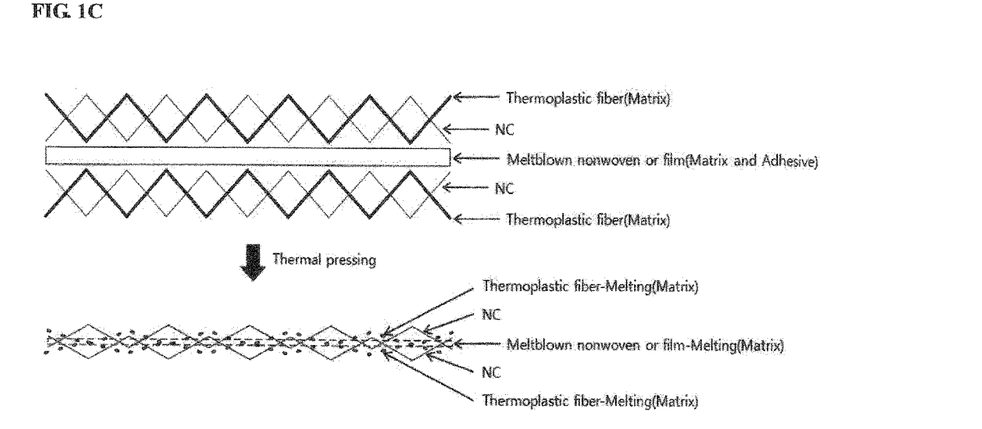
FIG. 1C illustrates a multi-layered composite material formed by thermocompressing of the NC/first thermoplastic matrix polymer and the second thermoplastic matrix polymer, which is an adhesive layer, according to an exemplary embodiment of the present invention.

The multi-layered composite material of the present invention can have a tensile strength of 20 MPa to 80 MPa. The multi-layered composite material of the present invention has more excellent strength compared to the multi-layered composite material (see FIG. 1B), which was manufactured by thermocompressing the second sheet layer formed from a solution containing nanofibrillated cellulose without containing the thermoplastic matrix polymer and has a tensile strength of about 8 MPa to 10 MPa.

In the present invention, the first sheet layer is formed from a solution containing nanofibrillated cellulose and the first thermoplastic matrix polymer. First, a pulp is dispersed in a solvent and subjected to mechanical refining and then prepared into a nanofibrillated cellulose suspension using a homogenizer. Then, the thermoplastic matrix polymer is mixed with the nanofibrillated cellulose suspension to prepare a composite material in the form of a sheet by wet web formation and a drying process.

The pulp used as a raw material for manufacturing the nanofibrillated cellulose of the present invention may be a soda pulp (AP), a semi-chemical pulp, a craft pulp, etc., and specifically bleached sulfite pulp, but the pulp is not limited thereto.

Additionally, the solvent for dispersing cellulose is preferably water, but is not limited thereto. Since cellulose nanofiber is hydrophilic, the use of a hydrophobic solvent may cause a problem of non-uniform dispersion.

The nanofibrillated cellulose and the first thermoplastic matrix polymer may preferably have a solid weight ratio of 3:7 to 5:5. When the weight ratio is lower than 3:7 (e.g., 2:8), the mixture may be separated from the solvent (water) after dispersion, while forming a layer by the difference in density between nanofibrillated cellulose and the first thermoplastic matrix polymer. When the weight ratio is higher than 5:5 (e.g., 6:4), the drainage of water may not work well and a serious curling phenomenon may occur during the drying process. This is because the solvent (water) molecules remaining between nanofibrillated cellulose act as an adhesive that links fibers, thereby forming a hydrogen bond network. In an exemplary embodiment, the solid weight ratio between nanofibrillated cellulose and the first thermoplastic matrix polymer may be about 4:6.

The wet web formation and drying process is a process for manufacturing in the form of a sheet by pressing rolls after obtaining uniform fiber structures on a sheet by selectively removing a solvent in a mixture of a nanofibrillated cellulose suspension and thermoplastic matrix polymer.

The wet web formation is a process for preventing curling of a prepared sheet while increasing its density by applying a pressure thereon at high temperature prior to drying the prepared sheet. The application of pressure may be performed by hot-press, but is not limited thereto. Through the compressing step, the volume of pores between nanofibrillated cellulose and thermoplastic matrix polymer, generated during the process of wet web formation, can be reduced, and the interfacial wettability can be improved. In particular, regarding the temperature and the pressure during the compressing step, higher is more preferable.

Additionally, the drying process is preferably performed to the water content of less than 1%. The drying is preferably performed at 30° C. to 100° C. under atmospheric pressure for 0.5 hours to 30 hours. In an exemplary embodiment, the drying is performed at 80° C. under atmospheric pressure for 24 hours. The temperature and drying time can affect the water content of the final sheet, and in a high temperature condition of 100° C. or higher, the sheet may be distorted or its physical properties become undesirable by rapid drying.

In order to provide the adhesive force to the sheet formed by the wet web formation and drying process, the sheet may be further subjected to conditions of a temperature of 150° C. to 250° C. and a pressure of 2 MPa to 300 MPa. In an exemplary embodiment, the sheet may be subjected to a condition of a temperature of 210° C. and a pressure of 4.8 MPa. Under the temperature and the pressure, the thermoplastic matrix polymer fibers become melted and impregnated, and the thermoplastic matrix polymer forms nanocomposites along with the nanofibrillated cellulose fiber by the impregnation. The representative processes for applying the high temperature and high pressure described above may include a calendaring and a hot-pressing, but are not limited thereto.

The multi-layered composite material of the present invention comprising nanofibrillated cellulose can be used as an environmentally friendly high-performance new material for the next generation to replace the existing glass fiber-reinforced composite materials. That is, the multi-layered composite material having high performance and high function can expand its applications as a core material to the industrial field, such as electronics, transporting devices (e.g., automobiles, aircraft, ships, etc.), civil engineering, construction, environment, etc., the defense industry, and prosthetic devices in the medical industry, in which products with low weight and high strength are required.

Advantageous Effects of the Invention

The multi-layered composite material of the present invention is characterized in that a first thermoplastic matrix polymer and a second thermoplastic matrix polymer are hot-melt bonded and nanofibrillated cellulose is inserted between the hot-melt bonded polymers by thermocompressing a first sheet layer formed from a solution containing nanofibrillated cellulose and the first thermoplastic matrix polymer with a second sheet layer formed from a solution containing the second thermoplastic matrix polymer. Accordingly, the multi-layered composite material of the present invention has high density, excellent tensile modulus, flexural modulus, and fracture properties, and has more excellent strength compared to the existing glass fibers.

Additionally, since the first thermoplastic matrix polymer of the first sheet layer and the second thermoplastic matrix polymer of the second sheet layer are mutually hot-melted, and the hot-melted layer can serve as an adhesive layer, the adhesion force between the layers is excellent.

DETAILED DESCRIPTION OF THE INVENTION

Hereinafter, the present invention will be described in detail with reference to the following Examples. However, the Examples of the present invention may be embodied in many different forms and these Examples should not be construed as limiting the scope of the present invention.

Example 1: Preparation of a Composite Material Containing Nanofibrillated Cellulose and Thermoplastic Matrix Polymer First, a pulp dispersion was prepared by dispersing a hardwood pulp of a fiber length of 1.0 mm into water, followed by dissociation via mechanical refining in a pulper for 30 minutes. A pulp dispersion of a solid concentration of 0.2 wt % was prepared, stirred for 30 minutes, and then fibrillated by a homogenizer.

The pulp dispersion was passed through three nozzles of different size, installed in a high pressure homogenizer, in a sequential order of nozzle diameter, as follows: 1) 5 times: nozzle diameter 250 μm, pressure 70 MPa, 2) 5 times: nozzle diameter 200 μm, pressure 240 MPa, and 3) 5 times: nozzle diameter 150 μm, pressure 310 MPa. The cellulose dispersion was passed 5 times per nozzle (i.e., a total of 15 times of the homogenizing process), and a nano sized fibrillated cellulose (nanofibrillated cellulose, NC) suspension was thereby prepared.

Figure 2:
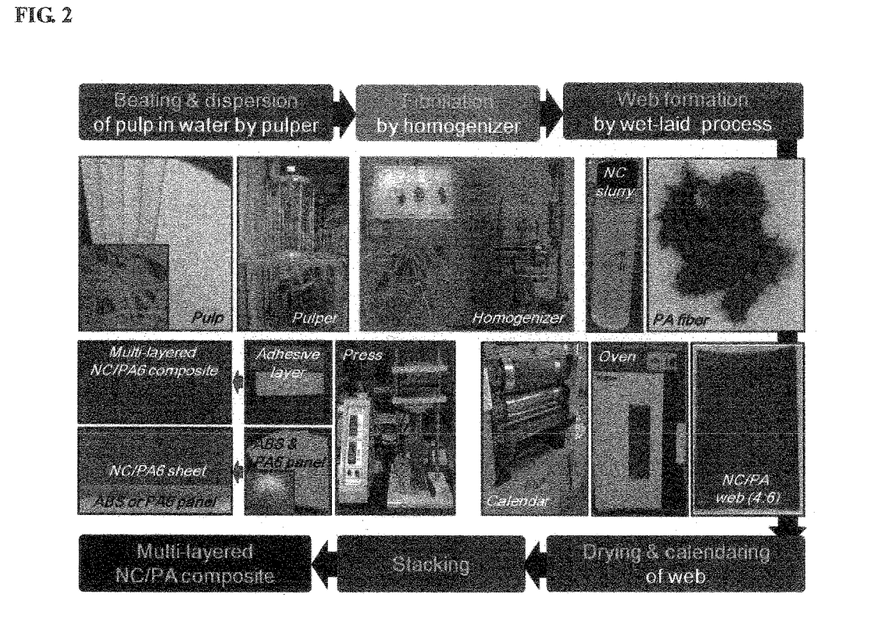
FIG. 2 shows a process chart of manufacturing a multi-layered composite material in the form of a sheet using nanofibrillated cellulose and thermoplastic matrix polymer by the wet web formation and drying processes.

The thus-prepared NC suspension and two kinds of polyamide (PA) fibers (PA6 or PA66) were mixed at a weight ratio of solid content of about 4:6, and the NC/PA composite material was prepared in the form of a sheet as illustrated in FIG. 2 by the wet web formation and drying processes. In particular, the length of the PA fiber used was 1.0 mm. The NC/PA6 sheet was prepared by a wet web formation process using 1,000 gradation stainless steel screen mesh, and dried under the conditions of 3.4 MPa pressure and at 80° C. for 2 hours in a heating press, and kept in an oven at the same temperature for 24 hours for further drying. To give an adhesive force, thus-dried NC/PA6 sheet was passed through a roll calendar at 210° C. under the pressure of 4.8 MPa at a speed of 0.5 m/min.

Figure 3:
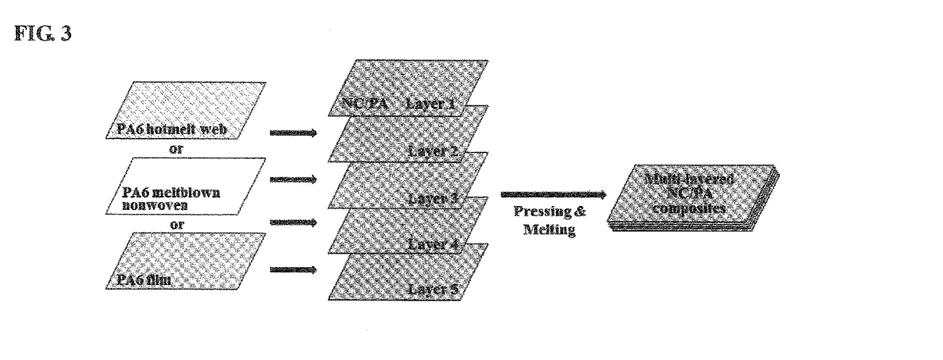
FIG. 3 shows a structure of a multi-layered composite material consisting of an NC/PA composite material and an adhesive layer (a hot-melt web, a meltblown nonwoven fabric, and a film), according to an exemplary embodiment of the present invention.
Figure 4:
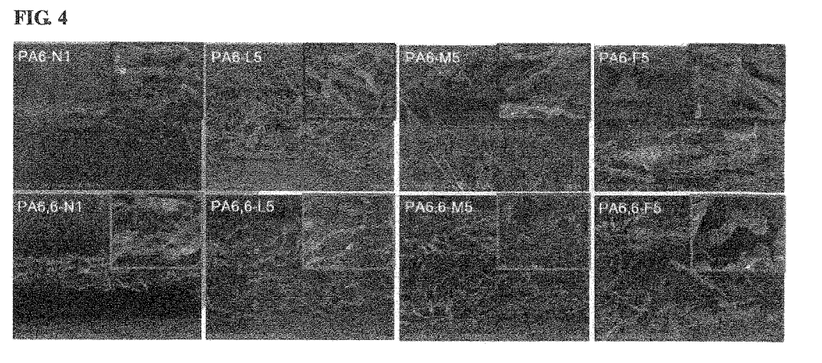
FIG. 4 shows the scanning electron microscope images of the surfaces and cross-sections of an NC/PA multi-layered composite material of Example 2.

Example 2: Preparation of a Multi-Layered Composite Material Using a Composite Material Containing Nanofibrillated Cellulose and Thermoplastic Matrix Polymer For the preparation of a multi-layered composite material, as illustrated in FIG. 3, a PA6 hot-melt web, a meltblown nonwoven fabric, or a film was laminated between the NC/PA6 sheet layers prepared in Example 1, with a structure of 1 to 5 layers. In particular, the weight of the PA6 hot-melt web, the meltblown nonwoven fabric, and the film used were 17 g/m², 100 g/m² and 175 g/m². Table 1 below represents the materials, thermocompressing conditions, NC contents, and sample names of the NC/PA multi-layered composite materials prepared in 1 to 5 layers. The surfaces and cross-sections of the NC/PA multi-layered composite materials were analyzed via a scanning electron microscope (SEM) (SU8000, Hitachi, Japan), and the results are shown in FIG. 4.

TABLE 1

| Matrix or Adhesive Layer | Thermocompressing Conditions | No. of Layers | NC Content (wt %) | Total Thickness (μm) | Sample Name |
|---|---|---|---|---|---|
| — | — | 1 | 40.0 | 40 | N1 |
| PA hot-melt web | 150° C./60 sec | 2 | 38.0 | 160 | L2 |
| | | 3 | 37.4 | 280 | L3 |
| | | 4 | 37.1 | 400 | L4 |
| | | 5 | 37.0 | 490 | L5 |
| PA meltblown nonwoven fabric | 210° C. to 230° C./60 sec | 2 | 34.7 | 260 | M2 |
| | | 3 | 33.3 | 420 | M3 |
| | | 4 | 32.6 | 620 | M4 |
| | | 5 | 32.2 | 830 | M5 |
| PA Film | 210° C. to 230° C./120 sec | 2 | 38.0 | 170 | F2 |
| | | 3 | 37.4 | 290 | F3 |
| | | 4 | 37.1 | 400 | F4 |
| | | 5 | 37.0 | 540 | F5 |
| — | 190° C./600 sec Preheating followed by 240° C./1,200 sec (87 MPa) | 3 | 40.0 | 100 | S3 |

Experiment 1: Physical Properties of the NC/PA Composite Materials and the Multi-Layered Composite Material Prepared Using the Same (1) Tensile Modulus The tensile modulus of the composite materials was evaluated according to ASTM D638-03 using a universal testing machine (H100KS, Tinius Olsen, UK), and in particular, under the crosshead speed of 1.0 mm/min and a load cell of 2.5 kN.

Figure 5:
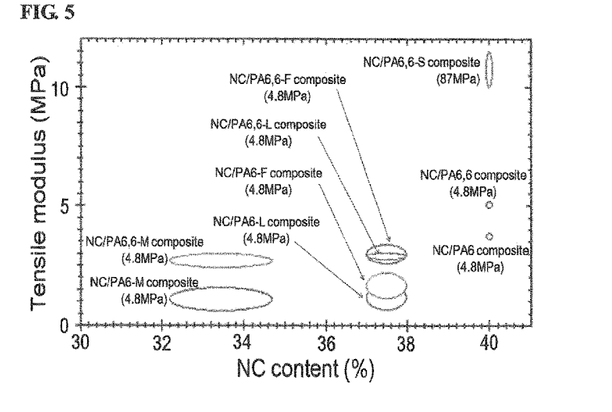
FIG. 5 shows a graph illustrating the tensile modulus of an NC/PA multi-layered composite material according to an adhesive layer, a thermocompressing pressure, and an NC content.

FIG. 5 illustrates the tensile modulus of the NC/PA multi-layered composite materials having different adhesive layers and NC contents, and being prepared under various thermocompressing pressures. That is, the tensile modulus of the NC/PA6 and NC/PA66 composite materials were measured, which were prepared by the method of Example 1 using PA6 or PA66 as polyamide fibers, and that of the multi-layered composite materials of Example 2, which were prepared using a PA hot-melt web (L), a PA meltblown nonwoven fabric (M), or a PA film (F) as the second thermoplastic matrix polymer layer (an adhesive layer or a second sheet layer). In FIG. 5, the NC/PA66-S composite materials were prepared by thermocompressing of three NC/PC66 sheets without using a matrix as in Example 2.

Although the tensile modulus of PA66 sheet was 0.8 MPa, the tensile modulus of NC/PA6 and NC/PA66 composite materials was shown to be in the range of 1 MPa to 2 MPa and 3 MPa to 12 MPa according to NC contents. The tensile modulus of the NC/PA66 multi-layered composite material was higher than that of the NC/PA6 composite material, and the tensile modulus of the NC/PA6 composite material increased as the NC content increased. Additionally, the NC/PA multi-layered composite material subjected to thermocompressing at a pressure of 87 MPa was shown to have a higher tensile modulus compared to the NC/PA multi-layered composite material subjected to thermocompressing at a pressure of 4.8 MPa.

(2) Flexural Modulus

The flexural modulus of composite materials was evaluated according to ASTM D790-03 under the same conditions as in the evaluation of tensile modulus.

Figure 6:
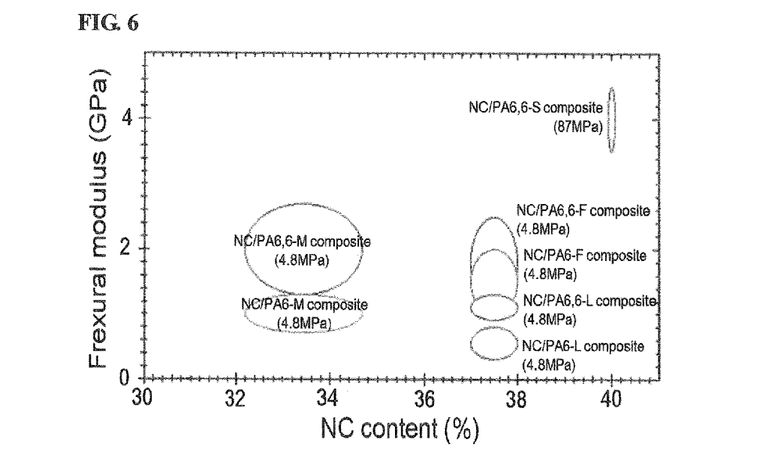
FIG. 6 shows a graph illustrating the flexural modulus of an NC/PA multi-layered composite material according to an adhesive layer, a thermocompressing pressure, and an NC content.

FIG. 6 illustrates the flexural modulus of the NC/PA multi-layered composite materials having different adhesive layers, NC contents, and being prepared under different thermocompressing pressure. The NC/PA66-S composite material subjected to thermocompressing at a pressure of 87 MPa was shown to have a higher flexural modulus than all of the other materials. Further, NC/PA multi-layered composite materials using a PA meltblown nonwoven fabric as an adhesive layer, even with its low NC content, had a flexural modulus similar to those of the NC/PA multi-layered composite materials using a PA hot-melt web and a PA film as an adhesive layer. Namely, when the same NC content and the same thermocompressing pressure were applied, the NC/PA multi-layered composite materials using the PA meltblown nonwoven fabric as an adhesive layer were shown to have a higher flexural modulus than the NC/PA multi-layered composite materials using the PA hot-melt web or PA-film as an adhesive layer. The NC/PA66 multi-layered composite material was shown to have a higher flexural modulus than the NC/PA6 multi-layered composite material in all kinds of the adhesive layer.

(3) Fracture Properties

The fracture properties of the NC/PA composite material were evaluated according to ASTM D671-71 using an electrodynamic test system (Acumen 1, MTS system, USA), the load cell used was 3 kN, and the test was performed at a frequency of 20 Hz for $10^6$ cycles.

Figure 7:
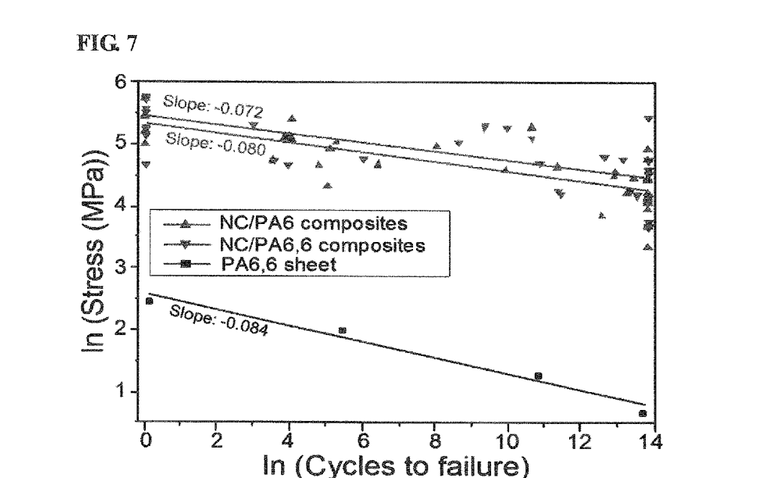
FIG. 7 shows a graph illustrating the fracture fatigue properties of the composite materials of PA66 sheet, NC/PA6, and NC/PA66.

FIG. 7 illustrates the fracture properties of PA66 sheet, and NC/PA6 and NC/PA66 composite materials. When experiments were performed repeatedly using a load cell of 3 kN at 20 Hz for $10^6$ cycles, it was confirmed that the reduction of fracture stress in the NC/PA66 composite material was smaller compared to those of the NC/PA6 composite material and the PA66 sheet. These results mean that the reinforcing effect of NC increases the service life of the NC/PA composite material. Additionally, the initial fracture stress value of NC/PA composite material was shown to be higher than that of the PA66 sheet due to the reinforcing effect of NC.

Accordingly, it was confirmed that an NC/PA composite material with increased tensile modulus, flexural modulus, and service life can be prepared using the NC as a reinforcing material for PA.

Experiment 2: Physical Properties of a Multi-Layered Composite Material Comprising NC/PA Composite Materials and a Thermoplastic Panel The method of preparing the NC with a homogenizer under high pressure and preparing the NC/PA sheets was the same as described in Example 1, and illustrated in FIG. 2. The thus-prepared NC/PA sheet was adhered to a polyamide (PA) panel (sample code: NY) and an acrylonitrile butadiene styrene (ABS) panel (sample code: AB), respectively, and thereby NC/PA/NY and NC/PA/AB composite materials were prepared. For the preparation of the NC/PA/NY and NC/PA/AB composite materials by thermocompressing between the NC/PA sheet and NY, or between the NC/PA sheet and AB, a PA6 hot-melt web (sample code: L, 17 g/m$^2$), a meltblown nonwoven fabric (sample code: M, 100 g/m$^2$), and a film (sample code: F, 175 g/m$^2$) were used as adhesive layers.

The thus-prepared NC/PA/NY and NC/PA/AB composite materials, a single NY panel (sample code: NY-N), and a single AB panel (sample code: AB-N), both without attaching the NC/PA sheet thereto, and an NC/PA thermocompressed sheet without the adhesive layer (sample code: S) were compared by their tensile characteristics, flexural characteristics, fracture properties, and impact characteristics.

In the preparation of the multi-layered composite materials, the thermocompressing between the composite materials and the adhesive layer for the samples of NY-S, NY-F, and NY-M was performed under the conditions of 210° C./40 seconds, and for the samples of NY-L and AB-L the thermocompressing was performed under the conditions of 130° C./60 seconds.

(1) Tensile Strength and Tensile Modulus

The tensile modulus of the NC/PA/NY and NC/PA/AB composite materials was evaluated according to ASTM D638-03 using a universal strength testing machine (H100KS, Tinius Olsen, UK), under the speed of 1.0 mm/min and a load cell of 50 kN.

Figure 8:
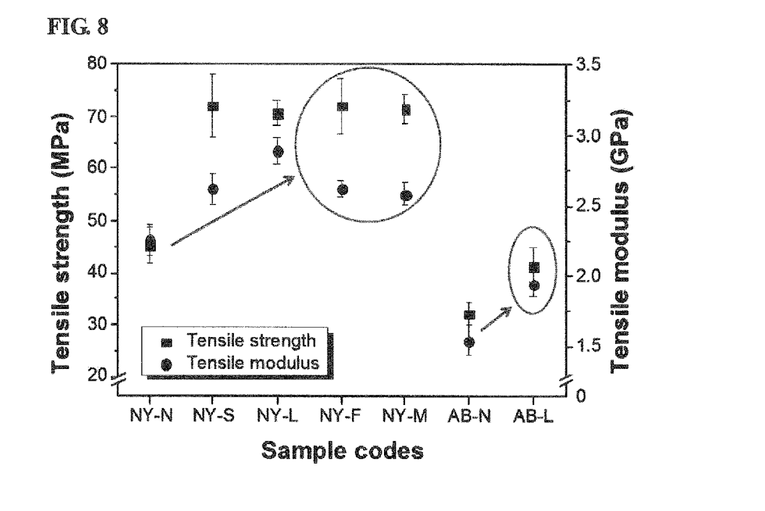
FIG. 8 shows a graph illustrating the tensile strength and tensile modulus of the composite materials of NC/PA/NY and NC/PA/AB.

FIG. 8 illustrates the tensile strength and tensile modulus of the NC/PA/NY and NC/PA/AB composite materials. The tensile strength and tensile modulus of the composite materials were increased by attaching an NC/PA sheet to the NY or AB panel. The tensile strength and tensile modulus of the NC/PA/NY composite material were increased compared to the NY panel by a maximum of 158% and 126%, respectively. Additionally, the tensile strength and tensile modulus of the NC/PA/AB composite material were increased compared to the AB panel by a maximum of 130% and 126%, respectively. In particular, it was confirmed that the tensile modulus of the NY panel subjected to thermocompressing using the PA hot-melt web as an adhesive layer showed a significant increase compared to the composite material, which was attached by the PA film or the PA meltblown nonwoven fabric.

(2) Flexural Strength and Flexural Modulus

The flexural modulus of the prepared composite material was evaluated according to ASTM D790-03, under the same conditions of Experimental 1.

Figure 9:
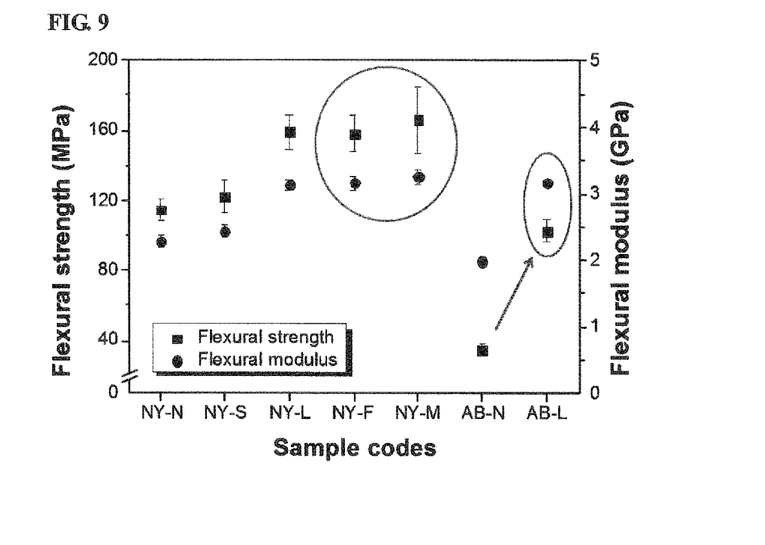
FIG. 9 shows a graph illustrating the flexural strength and flexural modulus of the composite materials of NC/PA/NY and NC/PA/AB.

FIG. 9 illustrates the flexural strength and flexural modulus of the NC/PA/NY and NC/PA/AB composite materials. The flexural strength and flexural modulus of the composite materials were increased by attaching an NC/PA sheet to the NY or AB panel, and in particular, the flexural strength and flexural modulus of the NC/PA/AB composite material were increased compared to the AB panel by 292% and 160%, respectively.

(3) Fracture Fatigue Properties

The fracture properties of the NC/PA/NY and NC/PA/AB composite materials were evaluated according to ASTM D671-71 using an electrodynamic test system (Acumen 1, MTS system, USA). The load cell used was 3 kN and the test was performed at a frequency of 10 Hz for $10^6$ cycles.

The fracture fatigue properties of the NC/PA/NY and NC/PA/AB composite materials are illustrated in Table 2 below. When tests were performed for $10^6$ cycles with a strength of 70%, 50%, and 30% of the maximum flexural force, the fracture cycle of the AB-L sample, in which NC/PA/AB was adhered with a PA hot-melt film, was shown to be highest with a strength of 70%. With a strength of 50%, the NY-F sample, in which the NC/PA/NY was attached with a PA film, showed the highest increase of the maximum fracture cycle. Additionally, with a strength of 30%, all samples passed the $10^6$ cycle test. It was confirmed that the number of the fracture cycles significantly increased in all case of the NC/PA/NY and NC/PA/AB composite materials regardless of the kinds of the adhesive.

TABLE 2

| Sample | Max. flexural force Number of cycles | | |
|---|---|---|---|
| codes | 70% | 50% | 30% |
| NY-N | 19 | 559 | Pass |
| NY-S | 35 | 704 | Pass |
| NY-L | 25 | 1739 | Pass |

TABLE 2-continued

| Sample codes | Max. flexural force Number of cycles | | |
|---|---|---|---|
| | 70% | 50% | 30% |
| NY-F | 1796 | 29823 | Pass |
| NY-M | 19 | 844 | pass |
| AB-N | 2798 | 43892 | Pass |
| AB-L | 4443 | 78627 | Pass |

(4) Impact Characteristics

The impact characteristics of the prepared composite materials were tested according to ASTM D 5420 using the Gardner impact test method (falling weight), which was performed by dropping a ball having a diameter of 50 mm from a height of 1,520 mm by a steel ball drop test machine.

Figure 10:
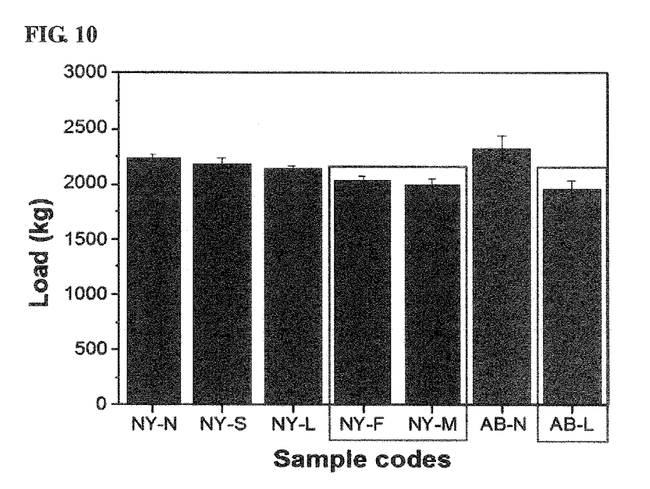
FIG. 10 shows a graph illustrating the impact strength of the composite materials of NC/PA/NY and NC/PA/AB.

FIG. 10 illustrates the impact characteristics of the NC/PA/NY and NC/PA/AB composite materials. The NC/PA/NY composite material showed an excellent impact absorbing characteristic compared to the NC/PA/AB composite material, and it was confirmed that impact characteristics are improved by the adhesion of the NC/PA sheet.

Accordingly, it was confirmed that tensile, flexural, fracture, and impact characteristics can be improved by attaching the NC/PA sheet to the NY and AB panels.

The invention claimed is:

1. A method of manufacturing a multi-layered composite material having at least one of a first sheet layer comprising a nanofibrillated cellulose and a first thermoplastic polyamide fiber in a weight ratio of 3:7 to 4:6 and a least one of a second sheet layer comprising a second thermoplastic polyamide fiber without nanofibrillated cellulose are alternately laminated by thermocompressing, wherein the method comprises:
 a first step of preparing the first sheet layer, the first step comprising
  1) forming a nanofibrillated cellulose suspension by mixing the nanofibrillated cellulose and the first thermoplastic polyamide fiber, wherein the diameter of the nanofibrillated cellulose ranges from 10 nm to 110 nm and the first thermoplastic polyamide fiber has a length ranging from 0.1 mm to 3.0 mm, and
  2) drying and compressing the nanofibrillated cellulose suspension to form the first sheet layer having pores;
 a second step comprising preparing the second sheet layer wherein the second sheet layer is a hot-melt web or a meltblown nonwoven fabric comprising the second thermoplastic polyamide fiber without nanofibrillated cellulose;
 a third step comprising alternately laminating
  1) at least one first sheet layer comprising the nanofibrillated cellulose and the first thermoplastic polyamide fiber in a weight ratio of 3:7 to 4:6; and
  2) at least one second sheet layer comprising the second thermoplastic polyamide fiber without the nanofibrillated cellulose to form alternately laminated multi-layers; and
 a fourth step comprising hot-melting the alternately laminated multi-layers by applying a pressure to the alternately laminated multi-layers at a temperature below the degradation temperature of nanofibrillated cellulose, wherein the second thermoplastic polyamide fiber flows into the pores of the first sheet layer to form a melt-connected polymer matrix between the first thermoplastic polyamide fiber, the second thermoplastic polyamide fiber and the nanofibrillated cellulose of the first sheet layer.

2. The method of claim 1, wherein the first thermoplastic polyamide fiber and the second thermoplastic polyamide fiber are the same or different polyamides having compatibility with nanofibrillated cellulose.

3. The method of claim 1, wherein the temperature in the fourth step is in the range of 100° C. to 200° C. when the second layer sheet is a hot-melt web, or in the range of 170° C. to 270° C. when the second layer sheet is a meltblown nonwoven fabric and wherein the applied pressure is in the range of 4 MPa to 110 MPa.

* * * * *